Fig. 7

United States Patent Office 3,561,295
Patented Feb. 9, 1971

3,561,295
HYDRAULIC CONTROL SYSTEM FOR AUTOMATIC TRANSMISSION
Tetsuya Iijima, Tokyo, Japan, assignor to Nissan Jidosha Kabushiki Kaisha, Yokohama, Japan
Filed Dec. 3, 1968, Ser. No. 780,790
Claims priority, application Japan, Dec. 19, 1967, 42/80,976, 42/80,977
Int. Cl. B60k 21/10
U.S. Cl. 74—869                              6 Claims

ABSTRACT OF THE DISCLOSURE

A hydraulic control system for automatic transmission mechanisms for vehicles to provide high engaging torque capacity of friction elements at high speed low throttle condition, in which a throttle back-up valve is provided to produce high throttle pressure to increase line pressure. The valve is actuated only at a specified manually shifted low gear ratio position.

---

Figure 1:
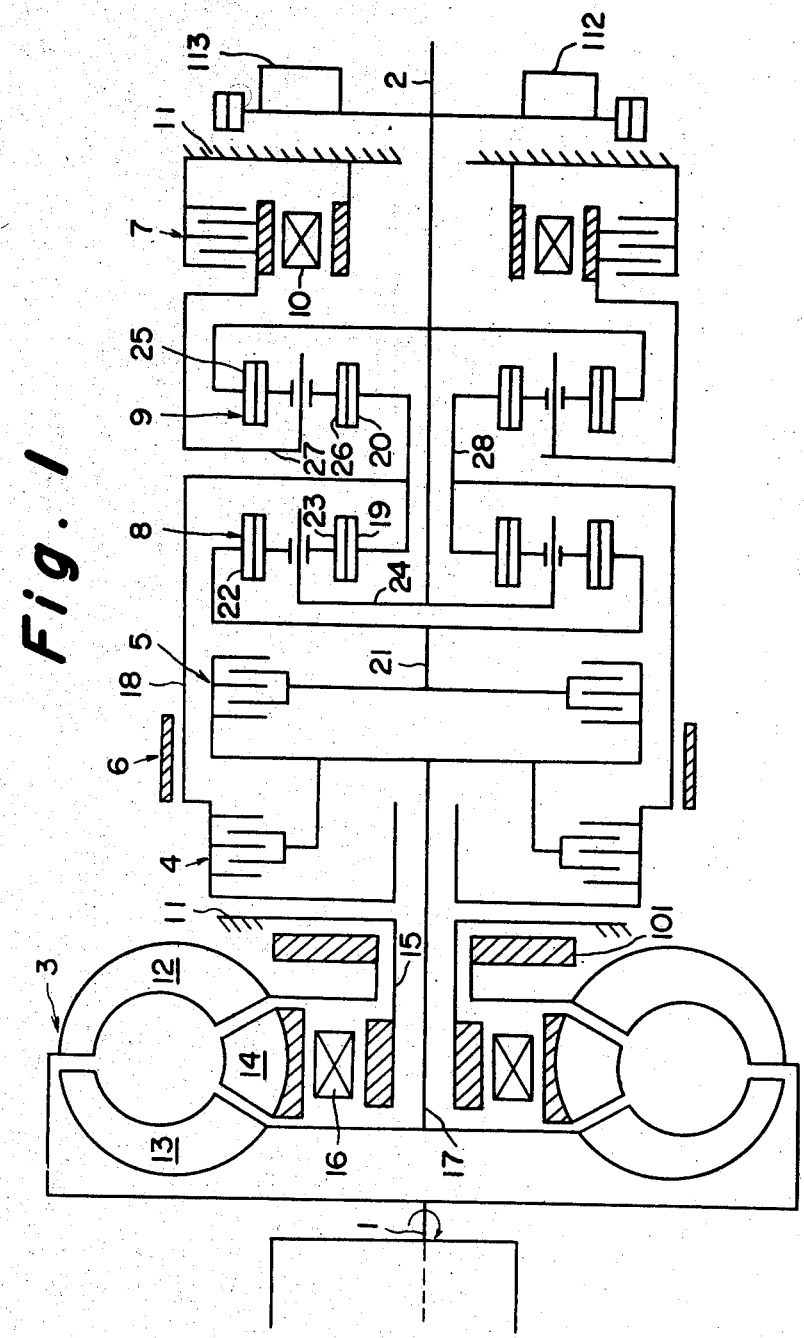

The present invention relates to a control system for a power transmission mechanism having multiple speed ratios, and more particularly to a hydraulic control system for an automatic transmission of a vehicle.

Automatic transmission mechanisms having planetary gear units usually include a plurality of friction elements, such as friction clutches and friction brakes, to provide a plurality of gear ratios by selectively engaging or releasing the friction elements. To attain smooth shifts between the gear ratios, hydraulic control systems are provided to detect engine output and vehicle speed and to change the capacity of the friction elements by regulating the actuating hydraulic pressure in relation to the detected values.

The torque of the friction elements, that is transmission torque of the friction clutch and braking torque of the friction brake, must be changed in accordance with engine loads and the vehicle speeds. The necessary torque capacity increases as the engine load increases and must be relatively large at starting or low speed and relatively small at higher speed. In the specification and claims, "friction clutch" means engageable and disengageable means to connect or disconnect torque transmission between rotatable members, "friction brake" means an engageable and disengageable means to clamp or release a rotatable member to a stationary portion of the transmission mechanism, and "friction element" includes such friction clutches and friction brakes.

When the torque capacity of such friction element is too small compared to the necessary torque capacity at that time, slipping between the members to be clamped to each other will be too great resulting in inaccurate operation or runaway of the engine. When the torque capacity of the friction element is too large, the clutch or brake will engage instantaneously and result in severe shocks. As the torque capacity depends on hydraulic pressure which actuates a hydraulic piston for operating the friction element, by controlling the hydraulic pressure so as to minimize the difference between the torque capacity of the friction element and the necessary torque to be transmitted or braked, smooth shift operation can be obtained without too much slipping and without any uncomfortable shock.

In known vehicles, when a low speed gear ratio is manually selected to attain engine braking effect while running at a high speed gear ratio, the actuating hydraulic pressure is low, since the engine is generally operating at low output, so that the capacity of the friction element is also small. Consequently, the engine brake function will not be effective, since the engaging friction brake slips too much and does not complete the shifting promptly.

By automatic shifting between the gear ratios of the above mentioned automatic transmission, the vehicle speed of the shifting point differs in accordance with the engine load; the vehicle speed is high when a large driving torque is necessary, as the engine load is high, and the vehicle speed is low when the necessary driving torque is relatively small, as the engine load is low. Consequently, when down-shift is desired to attain effective engine braking, automatic down-shift can be attained only at a low vehicle speed, since in such case the engine load will be low and the throttle opening will be small. To attain automatic down-shift in such case, the accelerator pedal must be depressed which is the reverse of the action to apply the brake.

Accordingly, it is a primary object of the present invention to provide a hydraulic control system for automatic transmissions, in which means are provided to increase actuating hydraulic pressure at the high speed and low engine torque operation, so that the capacity of the friction elements is increased and shifting to the desired low speed ratio is concluded promptly.

It is another object of the present invention to provide the above-mentioned hydraulic control system, in which the increasing of hydraulic pressure is effected only at a predetermined manually selected position, so as not to have an adverse effect on ordinary operations.

A further object of the present invention is to provide the above mentioned hydraulic control system, in which at a predetermined shifting, the shifting vehicle speed is not influenced by the engine load.

Still another object of the present invention is to provide such a hydraulic control system, in which when the automatic transmission provides further low speed ratio shifting ranges having an engine brake effect, the increased hydraulic pressure decreases again to prevent excess shock by providing too large capacity of the engaging friction brake, as the difference between the gear ratios of the shifting stages is relatively large.

Another object of the present invention is to provide the above mentioned hydraulic control system, in which when the automatic transmission provides means for automatic upshifting from low, and intermediate speed, to high speed, and the increase of hydraulic pressure is effected to the intermediate range, the hydraulic pressure will be too large for the low to intermediate upshifting and results in excess shock, means are provided to prevent any increase of the hydraulic pressure at the upshifting.

A further object of the present invention is to provide the above mentioned hydraulic control system in which a simple valve means is provided to attain the above mentioned features and is adapted to be easily mounted without any adverse effect to other essential portions.

Figure 2:
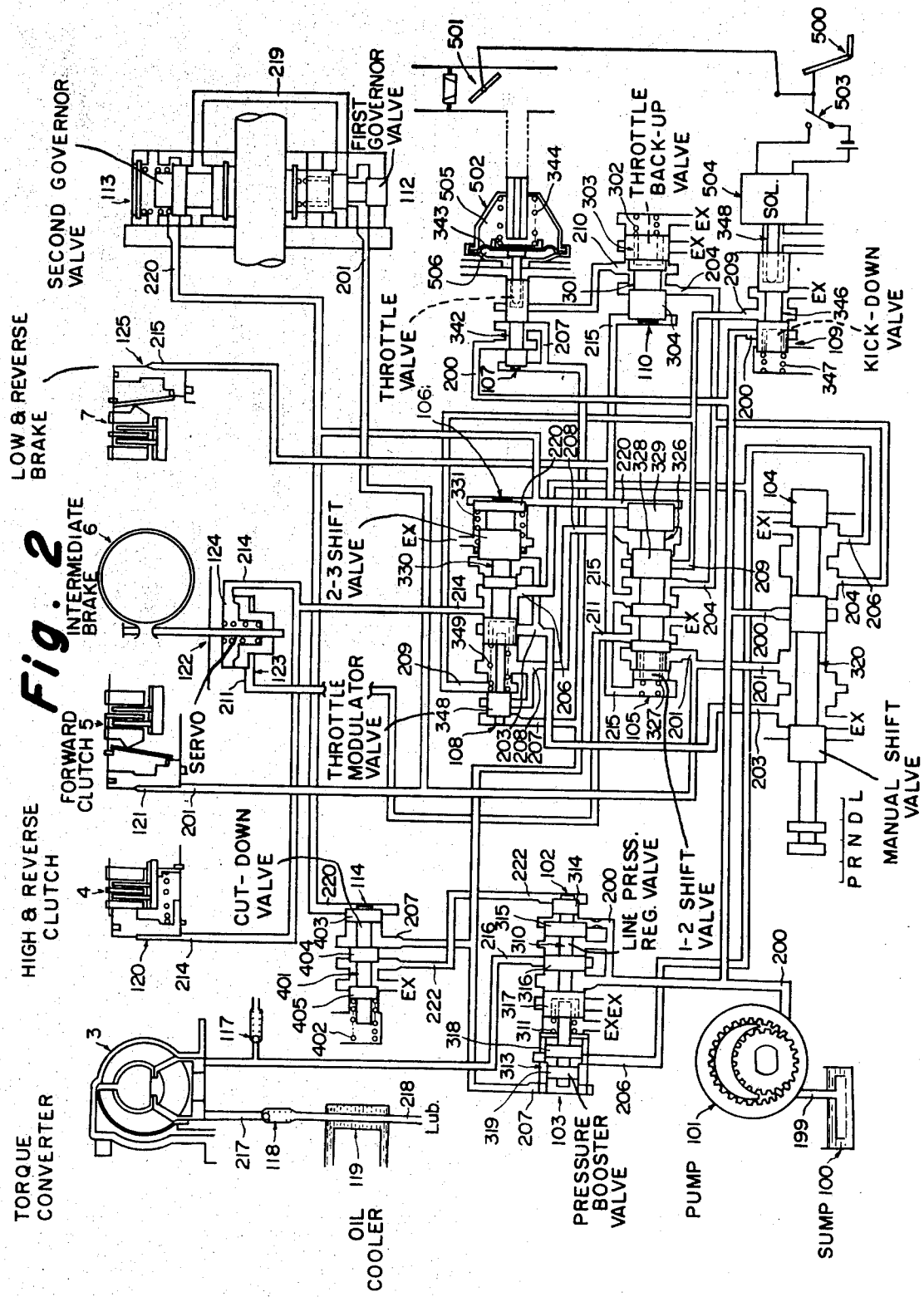
Figure 3:
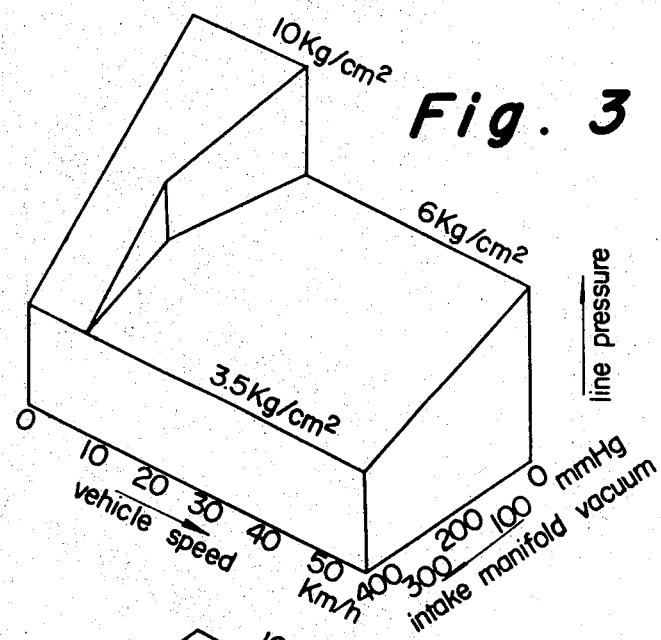
Figure 4:
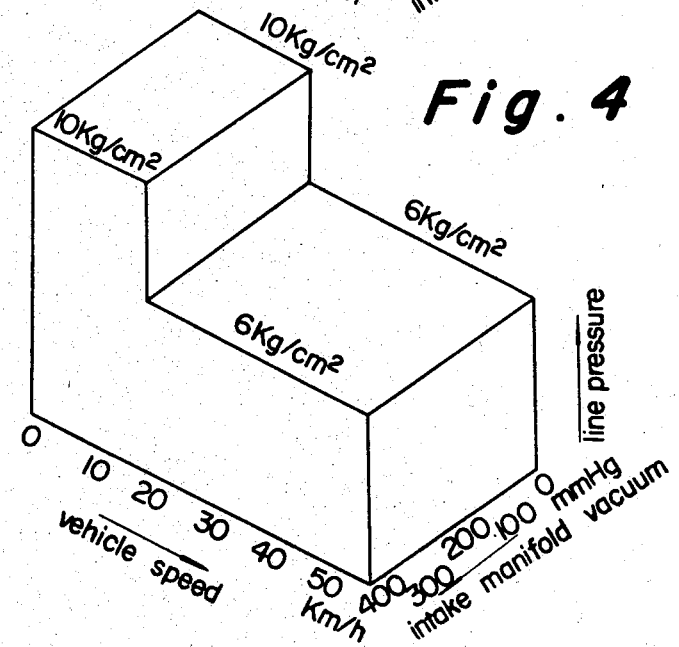
Figure 5:
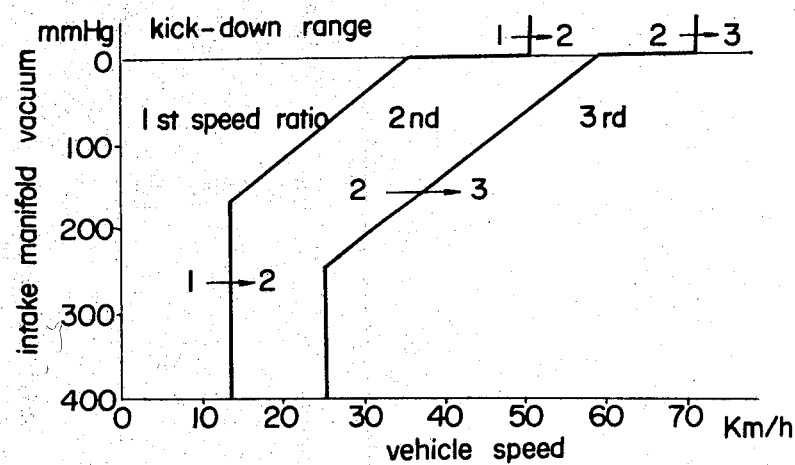
Figure 6:
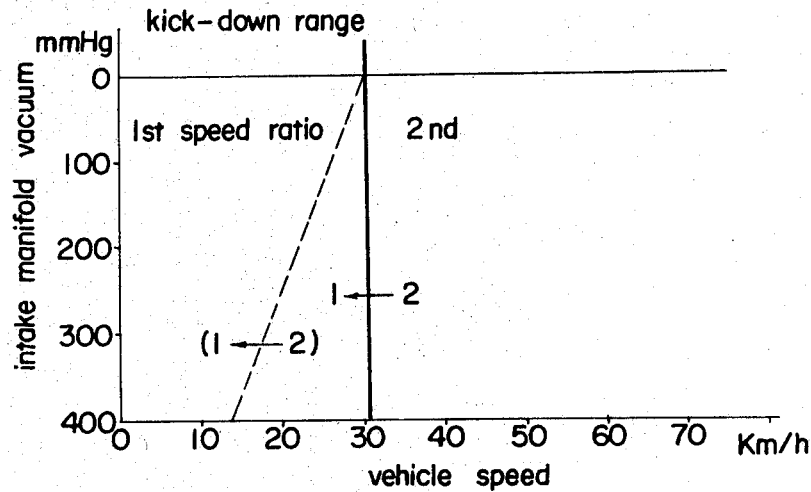
Figure 8:
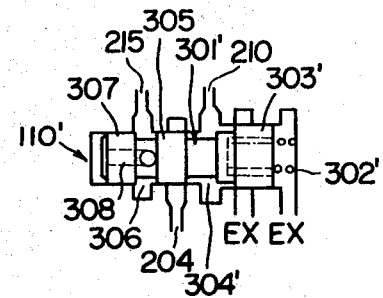
Figure 9:
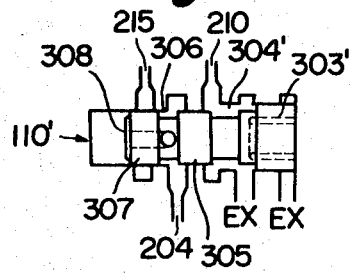

Further and more specific objects, features and advantages of the present invention and the manner in which the invention is carried into practice are made apparent in the following detailed description of preferred embodiments, by way of example, wherein reference is made to the accompanying drawing, in which:

FIG. 1 shows a diagrammatic illustration of a power transmission mechanism of automatic transmission of a vehicle, FIG. 2 shows a diagram of one embodiment of hydraulic control system according to the invention controlling the transmission shown in FIG. 1, FIG. 3 shows a characteristic diagram of hydraulic pressure at "D" and first speed of "L" range, FIG. 4 shows a characteristic diagram of hydraulic pressure at second speed of "L" range, FIG. 5 shows an up-shift characteristic chart of "D" range in relation to throttle pressure and vehicle speed, FIG. 6 shows a down-shift characteristic chart of "L" range in relation to throttle pressure and vehicle speed, FIG. 7 shows a diagram of second embodiment of hydraulic control system according to the invention, and FIG. 8 and FIG. 9 show two operating positions of throttle back up valve shown in FIG. 7.

In the drawing, same reference numerals are used for similar parts for sake of clarity.

FIG. 1 shows in a schematic form a typical power transmission mechanism providing a three element torque converter unit and two planetary gear units. While this is used as an example to describe the invention, it will be understood that the invention has application to any apparatus comprising a torque converter or a hydraulic coupling unit and a plurality of planetary gear units and providing a hydraulic control system to effect automatic shifting between speed ratios.

The transmission mechanism shown comprises an input shaft 1, an output shaft 2, a torque converter assembly 3, two friction clutches 4 and 5, two friction brakes 6 and 7, each clutch and brake being actuated by hydraulic pressure, two planetary gear units 8 and 9, a one-way brake 10, and a casing 11 accommodating the planeary gear units and the friction elements. The torque converter 3 comprises an impeller 12 connected to the input shaft 1, a turbine 13 which is driven by the impeller 12, and a stator 14 which is connected to a stationary shaft 15 through a one-way brake 16, and is filled with working fluid transmitting the driving torque. The power transmitted by the engine drive shaft 1 through the impeller 12 and the working fluid to the turbine 13 is transmitted through an intermediate shaft 17 which is connected to the turbine 13 and to the friction clutches 4 and 5.

The friction clutch 4 is connected through a drum 18 to sun gears 19 and 20 of the planeary gear units 8 and 9 respectively. The friction clutch 5 is connected through an intermediate shaft 21 to a ring gear 22 of the planetary gear unit 8. A plurality of planet gears 23 meshing with the ring gear 22 and the sun gear 19 are supported by a carrier 24 secured to the output shaft 2 which is also secured to a ring gear 25 of the rear planetary gear unit 9. A plurality of planet gears 26 meshing with the ring gear 25 and the sun gear 20 are supported by a carrier 27 which is connected to the friction brake 7 and the one-way brake 10. The friction brake 7 clamps by engagement thereof the planet gear carrier 27 and the one-way brake 10 permits rotation of the carrier 27 only to the direction of the input shaft 1 indicated by an arrow. The friction brake 6 clamps, by tightening to the drum 18, the sun gears 19 and 20 through a hollow transmission shaft 28.

The transmission mechanism shown in FIG. 1 provides three forward and one reverse speed ratios by suitable engagement of the friction elements as shown in Table 1.

TABLE 1

| Speeds | Gear ratio | Friction elements engaged— | | | | |
|---|---|---|---|---|---|---|
| | | Clutch | | Brake | | One-way Brake 10 |
| | | 4 | 5 | 6 | 7 | |
| 1st | 2:45 | — | o | — | — | o |
| 2nd | 1:45 | — | o | o | — | — |
| 3rd | 1:00 | o | o | — | — | — |
| 1st (manual low) | 2:45 | — | o | — | o | o |
| Reverse | 2:18 | o | — | — | o | — |

In the Table 1: "o" shows engagement of the friction element or locking of the one-way brake; and "—" shows disengagement or free relative rotation thereof.

In FIG. 1, no hydraulic control system actuating the friction elements are shown, however, a few of the functional members being shown, these are an engine driven fluid pump 101 and a governor valve assembly 112 and 113 which is connected to the output shaft 2.

FIG. 2 shows a hydraulic circuit diagram of a hydraulic control system which is adapted to control the power transmission mechanism shown in FIG. 1, according to one preferred embodiment of the present invention. The hydraulic control system comprises a fluid sump 100, the fluid pump 101, a line pressure regulator valve 102, a pressure booster valve 103, a manual shift valve 104, a 1–2 shift valve 105, a 2–3 shift valve 106, a throttle valve 107, a throttle modulator valve 108, a kick-down valve 109, a throttle back-up valve 110, a first governor valve 112, a second governor valve 113, a line pressure cut down valve 114, a torque converter relief valve 117, and a torque converter check valve 118 to effect desired automatic shifting between the above mentioned speed ratios by introducing predetermined fluid pressure to the friction elements. The control system further includes a hydraulic servo 120 to engage the friction clutch 4 by introducing hydraulic pressure to the servo 120, a hydraulic servo 121 to operate the friction clutch 5, a hydraulic servo 122 to operate the friction brake 6, an engage side brake chamber 123 and a release side brake chamber 124 of the hydraulic servo 122, a hydraulic servo 125 to operate the friction brake 7, and also as control components, an accelerator pedal 500, a carburetor throttle valve 501, a vacuum diaphragm unit 502, a kick-down switch 503 and a kick-down solenoid 504, and actuating and controlling conduits and passages properly connecting the valves and components to provide desired hydraulic control of automatic transmission.

As a single hydraulic pressure source, operating fluid of the hydraulic control system, working fluid of the torque converter 3 and lubricant fluid of the transmission mechanism are delivered by the positive displacement fluid pump 101 which is driven by the engine as shown in FIG. 1 and is adapted to draw fluid from the sump 100 and to supply fluid under pressure to a main line pressure passage 200. The fluid pressure in the passage 200 is the main source of the hydraulic circuit and is mentioned as line pressure.

The line pressure is regulated by the line pressure regulator valve assembly 102 and 103 as will be described in more detail hereinafter. Fluid under pressure which is supplied to the torque converter 3 from the passage 200 through the pressure regulator valve 102 and passage 216 is regulated by the torque converter relief valve 117 which relieves fluid to the sump 100 when the line pressure is increased beyond a predetermined value. Fluid pressure in the torque converter 3 is maintained by the torque converter check valve 118, and the fluid passed through the check valve 118 is delivered through an oil cooler 119 to portions to be lubricated.

The manual shift valve 104 comprises a valve spool 320 which is operable by the vehicle operator to introduce line pressure through passage 200 to passages 201, 203, 204 or 206 as shown in Table 2, according to selected shift positions R, N, D, and L respectively.

TABLE 2

| Selected position | R | N | D | L |
|---|---|---|---|---|
| Passage: | | | | |
| 201 | — | — | o | o |
| 203 | — | — | o | — |
| 204 | o | — | — | o |
| 206 | o | — | — | — |

In the Table 2: "o" shows communication of the passage to line pressure at the selected position, and "—" shows communication to exhaust port at the selected position. The operation of the power transmission mechanism shown in FIG. 1 according to the selected position R. N, D and L will be: reverse drive by position R, neutral by position N, automatic three speeds forward by position D, 1st or 2nd speed, and shift down only from 2nd to 1st by position L.

The manual shift valve spool 320 is shown in the neutral N position in FIG. 2, and prevents all operating passages from line pressure 200 and communicates to exhaust ports Ex. which communicate to the sump 100 through passages not shown.

When the operator shifts the manual shift valve 104 to the automatic three speeds forward position D, passages 201 and 203 communicate to the line pressure passage 200. The line pressure supplied through passage 201 actuates the hydraulic servo 121 of the friction clutch 5 to engage the friction clutch 5 all through the three speeds forward drive. Further, the passage 201 communicates to the 1-2 shift valve 105 and the first governor valve 112. The line pressure through the passage 203 is supplied to the 2-3 shift valve 106.

The 1-2 shift valve 105 comprises a valve spool 326 which is biased by a spring 327 to keep the valve spool 326 to the rightward position as shown in FIG. 2 at 1st speed ratio and blocks the passage 201 from communication anywhere. Thus only the friction clutch 5 is engaged, the vehicle drives forward at 1st speed ratio as shown in Table 1. In this case, as one-way brake 10 is effective, the engine drives the wheels, but the wheels cannot drive the engine, so that the engine brake function is not effective. As the vehicle speed increases, governor pressure through passage 220 urges the valve spool 326 leftward, as will be described in more detail hereinafter, so that passage 201 communicates to passage 211 to urge the engage side chamber 123 of the hydraulic servo 122 of the friction brake 6, thus the friction brake 6 and the friction clutch 5 are engaged and shifted to 2nd speed ratio.

The 2-3 shift valve 106 comprises a valve spool 330 which is biased to the rightward position as shown in FIG. 2 by a spring 331 at 1st and 2nd speed ratios. As the vehicle speed increases, governor pressure through passage 220 is increased sufficiently to urge the valve spool 330 leftward to communicate passage 203 to passage 214. Line pressure through passage 214 is supplied to the hydraulic servo 120 to engage the friction clutch 4 and also to the release side chamber 124 of the hydraulic servo 122 to release the friction brake 6. By area difference between the chambers 124 and 123, the friction brake 6 is released when both chambers 124 and 123 are supplied by line pressure, so that smooth shift process between the 2nd and 3rd speed ratios can be obtained. Thus as shown in Table I the power transmission mechanism shown in FIG. 1 is driven by 3rd speed ratio or direct coupling.

When the operator selects the position L by shifting the manual shift valve 104, line pressure through passage 200 communicates to passages 201 and 204. Line pressure through passage 201, as position D, engages the friction clutch 5 all through the position L. The passage 204 communicates to the 1-2 shift valve 105 and the throttle back-up valve 110. When the 1-2 shift valve is urged to the leftward position, passage 201 communicates to passage 211 to urge the hydraulic servo 122 to engage the friction brake 6 so that 2nd speed is obtained. As passages 203 and 206 are communicated to exhaust port respectively at position L, the release side chamber 124 and the hydraulic servo 120 are both communicated to exhaust, thus 3rd speed cannot be obtained at position L. However, at second speed, because of its gear ratio, an effective engine brake function is available while the vehicle is coasting.

As the 1-2 shift valve spool 326 moves rightward, passage 211 communicates to an exhaust port and the friction brake 6 is released, and passage 204 communicates to passage 215 to supply line pressure to the hydraulic servo 125 to engage the friction brake 7 so that 1st speed is obtained. In this case, the friction brake 7 clamps the planet carrier 27 of the rear planetary gear unit 9 to both directions, so that an engine brake function is available. Also, passage 215 applies hydraulic pressure to the left end surface of the spool 326 to urge and maintain the spool rightward or 1st speed position.

When the manual shift valve 104 is selected to position R, line pressure is supplied to passages 204 and 206. As no governor pressure is supplied to passage 220, passage 204 communicates through 1-2 shift valve 105 and passage 215 to the hydraulic servo 125 to engage the friction brake 7, and passage 206 communicates through 2-3 shift valve 106 and passage 214 to the hydraulic servo 120 to engage the friction clutch 4, thus as shown in Table 1, reverse drive is obtained driving the output shaft 2 to reverse direction.

The governor valve assembly 112 and 113 is mounted to the output shaft 2 of the power transmission as shown in FIG. 1 and adapted to supply hydraulic pressure representing the vehicle speed to passage 220. The governor valve may be in any construction representing the vehicle speed; in the illustrated embodiment, line pressure through passage 201 is introduced in the first governor valve 112 which is constructed as pressure regulator valve to produce increasing hydraulic pressure as a function to increasing rotational speed of the output shaft 2. The pressure which is determined by equilibrium between centrifugal force, spring bias pressure and hydraulic pressure is supplied through passage 219 to the second governor valve 113 constructed as a change-over valve and adapted to supply fluid pressure beyond a predetermined speed of the output shaft 2 or the vehicle to the passage 220. The governor pressure through passage 220 is supplied to the 1-2 shift valve 105 and the 2-3 shift valve 106 to urge the valve spools 326 and 330 as described before, when the vehicle speed exceeds respective predetermined values so that automatic shifting between the speed ratios can be attained. Also, the passage 220 is communicated to the right end surface of spool 401 of the line pressure cut-down valve 114 as will be explained in more detail hereinafter.

The kick-down valve 109 comprises a valve spool 346 which is biased to the rightward position by a spring 347 to block communication between passages 200 and 209. Engaging to right end surface of the spool 346, the kick-down solenoid 504 is provided. As the accelerator pedal 500 is depressed, the kick-down switch 503 is closed to energize the solenoid 504 thus actuate rod 348 to urge the valve spool 346 leftward so that line pressure through passage 200 communicates to passage 209. Fluid pressure through passage 209 communicates to left end surface of the spool 330 of the 2-3 shift valve 106 and to 1-2 shift valve 105 through passage 208, and the passage 209 communicates directly to the 1-2 shift valve 105. The passages 208 and 209 communicate to a groove between area difference lands 328 and 329 to urge the spool 326 rightward. Consequently, the valve spool 330 or 326 will move rightward when the urging force overcomes the biasing force of the governor pressure through passage 220, so that down-shift from 3rd to 2nd or from 2nd to 1st speed ratio will be obtained.

To detect the engine torque, throttle opening or vacuum pressure in the intake manifold of the engine or both may be available. In the illustrated embodiment, the engine torque is detected by vacuum pressure in the engine intake manifold. In general gasoline engine, the engine torque is higher as vacuum value in the intake manifold is lower. To detect the engine torque the vacuum pressure diaphragm unit 502 is provided to engage with the right end surface of the throttle valve 107, and when pressure in vacuum chamber 505 of the vacuum diaphragm unit 502 is equal to atmospheric pressure in chamber 506, throttle valve spool 342 is urged to leftward, and also, as the vacuum is increased in the chamber 505 the biasing pressure to the spool 342 is decreased. The throttle valve 107 acts as pressure modulator valve regulating the line pressure through passage 200 by leaking a portion thereof to passage 210 which normally communicates to exhaust port to produce a hydraulic pressure representing biasing force from the vacuum diaphragm unit 502 and also representing the engine torque to passage 207. The throttle pressure representing the engine torque through the passage 207 is supplied to the oil pressure booster valve 103, the throttle modulator valve 108 which is combined to the 2–3 shift valve 106, and the line pressure cut down valve 114. In the throttle modulator valve 108, spool 348 is urged rightward against biasing spring 349 so that a modulated pressure is supplied to passage 208. Thus the throttle pressure urges the spool 330 of the 2–3 shift valve 106 and the spool 326 of the 1–2 shift valve 105 respectively, in the latter case modulated pressure through passage 208 is applied between area difference lands 328 and 329 to urge the spool 326 rightward. As described before, governor pressure through passage 220 is supplied to the right end surface of the 1–2 shift valve 105 and the 2–3 shift valve 106 so that shifting of the spools 326 or 330 is determined in relation to governor pressure and throttle pressure. As the governor pressure represents vehicle speed and the throttle pressure represents engine torque, vehicle speed at shift point is effected by engine torque. FIG. 5 shows one example of chart showing upshift point in relation to vehicle speed and engine torque or engine manifold vacuum pressure. As shown in FIG. 5 when the engine torque is low, up-shift occurs at substantially proportional to the engine torque. Further, in the kick-down valve actuating range, the up shift occurs at higher speed.

The line pressure regulator valve assembly 102 and 103 consists of the line pressure regulator valve 102 comprising a spool 310 and a biasing spring 311 and the pressure booster valve 103 comprising a spool 313 which is assembled in line to the spool 310. Fluid pressure produced by the oil pump 101 is introduced through passage 200 between lands 314 and 315 of the spool 310 and urges the spool 310 leftward by the area difference between the lands 314 and 315 against biasing spring 311. When the fluid pressure in the passage 200 is higher beyond a predetermined value, the spool 310 is urged leftward to open communication between passages 200 and 216 and supply torque converter working fluid as previously mentioned. When the fluid pressure is further increased the spool 310 moves leftward and land 317 thereof opens exhaust port to leak a portion of fluid and to lower the hydraulic pressure in the passage 200. Thus an equilibrium is produced between the urging force and the biasing spring force, consequently the fluid pressure in passage 200 is regulated to the desired line pressure.

The line pressure booster valve 103 urges the spool 310 by the spool 313 when hydraulic pressure is applied to left end surface of land 319 through passage 207 or between area difference lands 318 and 319 through passage 206, so that line pressure increases to attain equilibrium between the forces. On the contrary, when hydraulic pressure is applied to right end surface of the spool 310 of the regulator valve 102 through passage 222, to urge the spool 310 leftward, the line pressure through passage 200 is decreased correspondingly to attain equilibrium again.

The line pressure cut-down valve 114 comprises a valve spool 401 and a biasing spring 402. Governor pressure through passage 220 is applied to right end surface of land 403 of the spool 401 to urge the spool 401 leftward against the spring force, and throttle pressure through passage 207 is applied between area difference lands 404 and 403 to urge the spool 401 rightward. Thus, when the force produced by governor pressure is larger than the force produced by the spring 402 and throttle pressure, spool 401 is urged leftward to communicate passages 207 and 222, and when governor pressure is lower the passage 222 is exhausted. Thus, line pressure changes in relation to both governor pressure and throttle pressure. Assuming that throttle pressure is constant, when governor pressure is low, the valve spool 401 of the cut down valve 114 is rightward and passage 222 is exhausted so that line pressure is high. As governor pressure is increased sufficiently to urge the spool 401 leftward, throttle pressure through passage 207 communicates to passage 222 to bias the right end surface of the land 314 of the spool 310 of the line pressure regulator valve 102 so that line pressure decreases stepwise. Thus, governor pressure causes only a stepwise increase or decrease of line pressure when the governor pressure is low or high.

Assume that governor pressure is constant, when governor pressure is low, throttle pressure through passage 207 is applied only to the left end surface of the land 319 of the pressure booster valve so that line pressure increases rapidly as throttle pressure increases. When governor pressure is sufficiently high, throttle pressure is applied in both the left end surface of the land 319 and the right end surface of the land 314 at the same time, and since the actual effect is on the area difference between lands 319 and 314, with the area of the land 319 being larger, line pressure increases gradually as throttle pressure increases. FIG. 3 shows line pressure in relation to vehicle speed and engine intake manifold vacuum. As shown in FIG. 3 line pressure is high at low vehicle speed and increases steeply as throttle pressure increases, so that capacity of the friction elements is increased to correspond large torque transmission demand at low vehicle speed. As the vehicle speed increases, throttle pressure is applied to both ends of the regulator valve, line pressure decreases stepwise and gradually increases as throttle pressure increases, so that sufficient torque transmission capacity is supplied to the friction elements at higher speed, and not too much capacity to produce shock.

The throttle back-up valve 110, according to one embodiment of the present invention, comprises a valve spool 301 and a spring 302 biasing the spool 301 leftward, and communicate through passage 210 to the throttle valve 107. The passage 210 is an exhaust port of known throttle valve, and also in this embodiment, when communicating passage 204 is exhausted or selected position D, and also, when hydraulic pressure through passage 215 is applied to left end surface of land 304 and urges the spool 301 rightward against the force of the spring 302 to block passage 204 and open exhaust port to passage 210, in both cases the passage 210 is exhausted. As passage 204 is exhausted when the manual shift valve 104 is selected position D, and as passage 215 is pressurized when selected position is R or 1st speed ratio of position L, the passage 210 of the throttle valve 107 is exhausted so that the throttle valve 107 delivers normal throttle pressure through passage 207 by leaking some fluid supplied through passage 200 to passage 210 or exhaust port.

When the passage 204 is pressurized and passage 215 is exhausted, i.e. at the second speed of position L, hydraulic pressure is applied between lands 304 and 303 of the spool 301 of the throttle back-up valve 110. As area difference is provided between the lands 304 and 303, the valve spool 301 is urged rightward so that a greater portion of the passage 204 is blocked by the land 304 and a portion of exhaust port is uncovered by the land 303, consequently a regulated hydraulic pressure is prevailed in the valve 110 and passage 210. As previously mentioned, in the throttle valve 107, hydraulic pressure through passage 207 is a value between hydraulic pressure through passage 200 and 210, no pressure regulating function of the vacuum diaphragm unit 502 effects to hydraulic pressure through passage 207, so that a substantially constant and higher than normal pressure prevails in the valve 107 and passage 207. Consequently, the line pressure through passage 200 which is regulated by the throttle pressure 207 in the pressure regulator valve assembly 102 and 103, is higher and as shown in FIG. 4 does not vary with engine manifold vacuum.

Thus, while the vehicle is driving at high speed gear ratio or 3rd speed ratio, when the operator shifts the manual shift valve 104 to position L to effect engine brake function, passage 203 is exhausted and passage 204 is communicated to line pressure. Thus, the friction clutch 4 is released and, as the 1-2 shift valve 105 is urged to left by governor pressure through passage 220, communication between passages 204 and 215 is blocked and line pressure through passage 201 communicates through the valve 105 and passage 211 to the engage side chamber 123 of the hydraulic servo 122 to engage the friction brake 6. In this case, as the operating condition is low throttle and high speed, corresponding forward portion of FIG. 3 so that in known apparatus the line pressure to engage the friction brake 6 is low resulting in excess slipping. By providing the throttle back-up valve 110, according to the invention, to increase line pressure at low selected position, the line pressure increases as shown in FIG. 4 at low throttle high speed operating condition, so that the friction brake 6 engages without excess slipping.

At position L, as the vehicle speed decreases automatic shifting to 1st speed will occur. In this case, as the gear ratio of the 1st speed is high, excess shock will occur if engaging torque capacity is too large resulting from high fluid pressure. When the 1-2 shift valve 105 is urged rightward fluid pressure through passage 204 is communicated through the valve 105 and passage 215 to left end surface of the spool 303 of the throttle back-up valve 110 according to the invention, to urge the spool 303 rightward so that passage 210 is exhausted to decrease fluid pressure through passage 207, consequently line pressure characteristic is shown substantially as shown in FIG. 3. Thus line pressure at low throttle condition is low and decrease engaging torque capacity of friction elements to engage the friction brake 7 without excess shock.

As described in detail, passage 210 is exhausted at position D, R and 1st speed ratio of L, so that in ordinary driving condition no high fluid pressure is applied to friction elements at low throttle operating condition, consequently the friction elements do not engage promptly at undesired operating conditions.

Further, at 2nd speed ratio of position L, as throttle pressure is substantially constant at any engine torque, shift down from 2nd to 1st speed ratio occurs at constant governor pressure. FIG. 6 shows 2-1 shift point of position L in relation to vehicle speed and engine torque, whereas dotted line shows the same graph without throttle back-up valve. As shown in FIG. 6, as the down shift occurs at constant vehicle speed and relatively high speed at low engine torque condition, desired effective engine brake function is attained.

Figure 7:
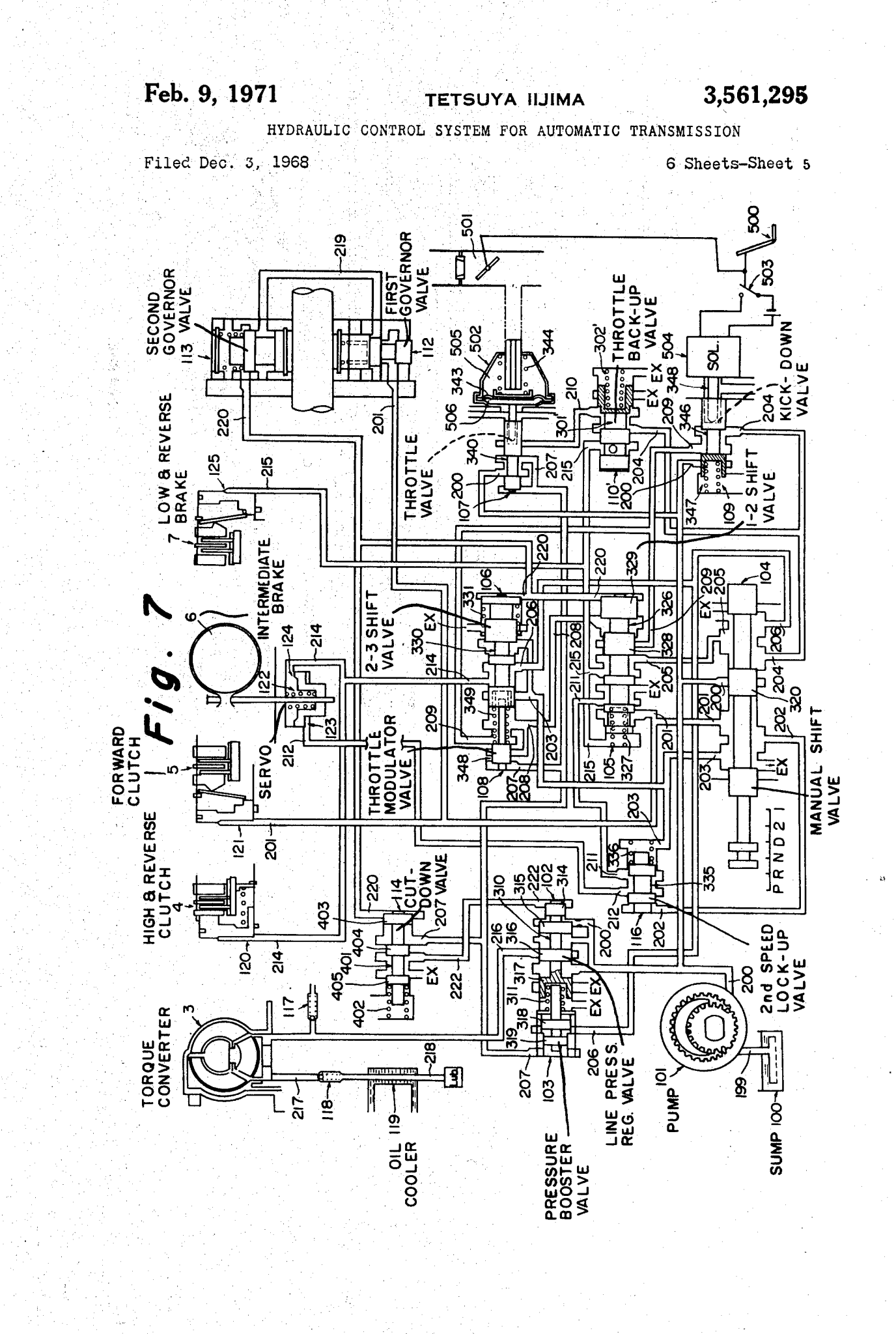

FIG. 7 shows another embodiment of the present invention. In this case, all the advantages described hereinbefore are attained, and further, for automatic transmission mechanism providing low, medium and high speed ratios, to prevent engaging shock at upshifting from low to medium speed ratio, the throttle back-up valve 110 shown in FIG. 2 is modified to decrease line pressure to ordinary operating valve at upshifting from low to medium speed ratio.

The hydraulic control system shown in FIG. 7 comprises substantially all the elements shown in FIG. 2 and same reference numerals are used for sake of clarity so that only the differences are described in detail hereinafter.

The hydraulic control system comprises further a throttle back-up valve 110' in place of valve 110, and 2nd speed ratio lock-up valve 116.

The manual shift valve 104 also comprises a valve spool 320 which is operated by the vehicle operator to introduce line pressure in the passage 200 to passages 201 through 206 as shown in Table 3, according to the selected positions of the shift lever not shown.

TABLE 3

| Selected position | P | R | N | D | 2 | 1 |
|---|---|---|---|---|---|---|
| Passage: | | | | | | |
| 201 | — | — | — | o | o | o |
| 202 | — | — | — | o | o | — |
| 203 | — | — | — | o | — | — |
| 204 | o | o | — | — | o | o |
| 205 | o | o | — | — | — | o |
| 206 | — | o | — | — | — | — |

In the Table 3: "o" shows communication of the passage to line pressure at the selected position; and "—" shows communication to exhaust port at the selected position. The operation of the power transmission mechanism shown in FIG. 1 according to the selected positions P, R, N, D, 2 and 1 will be as follows:

P: the output shaft 2 is locked by a locking device not shown,
R: reverse drive,
N: neutral, power is not transmitted to output shaft 2,
D: forward drive, the transmission shown is shifted automatically between 1st, 2nd and 3rd speed ratios,
"2": lock to 2nd speed ratio,
"1": down shift from 2nd to 1st speed ratio and maintaining to 1st speed ratio.

The manual shift valve spool 320 is shown in the neutral or N position in FIG. 7, and prevents all operating passages from line pressure and communicates to exhaust ports Ex which communicate to the sump 100 through passages not shown.

When the operator selects the position "2" by shifting the manual shift valve 104, the line pressure through passage 200 is supplied to passages 201, 202 and 204. The line pressure through passage 201, as selected position D, engages the friction clutch 5.

The 2nd speed lock-up valve 116 comprises a valve spool 335 which is biased to leftward position as shown in FIG. 7 by a spring 336 when passages 202 and 203 are both communicated to line pressure source or exhaust port, so that passages 211 and 212 are communicated each other, thus when the passage 211 is communicated to line pressure source of the 1-2 shift valve 105 the pressure is supplied to the engage side chamber 123 of the hydraulic servo 122 to the friction brake 6. When the position "2" is selected, the passage 202 communicates to line pressure source of the manual shift valve 104 and the passage 203 communicates to exhaust port, thus the valve spool 335 is urged rightward to communicate passage 202 to passage 212 so that line pressure is supplied to the engage side chamber 123 of the hydraulic servo 122 to engage the friction brake 6. Thus 2nd speed ratio is attained. The valve spool 335 maintains the rightward position throughout the selected position "2" and is not effected by vehicle operating conditions such as speed or throttle opening.

When the operator selects the position "1" by shifting the manual shift valve 104, line pressure through passage 200 is communicated to passages 201, 204 and 205. As before, line pressure through passage 201 acts to engage the friction clutch 5 all through the position "1." Line pressure through passage 205 communicates to passage 215 when the 1-2 shift valve 105 is rightward position as shown in FIG. 7, so that the line pressure actuates the hydraulic servo 125 to engage the friction brake 7, thus 1st speed ratio is obtained. If the 1-2 shift valve 105 is kept leftward by governor pressure through passage 220, when the manual shift lever selects the position "1" from other positions, passage 201 communicates through passage 211, the 2nd speed lock-up valve 116 and passage 212 to engage side chamber 123 of the hydraulic servo 122 to engage the friction brake 6. Thus 2nd speed ratio is attained. By the position "1," passages 203 and 206 are exhausted so that 3rd speed ratio cannot be attained because the friction clutch 4 is not engaged. When the 1-2 shift valve 105 is urged to rightward, 1st speed ratio is attained as before, and line pressure through passage 215 urges the valve spool 326 from left end surface of the spool 326, so that 1st speed ratio is maintained. In this case, as the friction brake 7 is engaged, the planet carrier 27 of the rear planetary gear unit 9 is clamped to both direction, compared to one-way brake 10 in case of 1st speed ratio of the position D, so that engine brake function can be obtained.

The throttle back-up valve 110', according to the embodiment of the present invention as shown in FIG. 7, comprises a valve spool 301' and a spring 302' biasing the spool 301' leftward, and communicates through passage 210 to the throttle valve 107 and also communicates through passage 204 to the manual shift valve 104. To a groove between lands 305 and 307, as shown in FIGS. 8 and 9, passage 215 is communicated to the 1–2 shift valve 105. As the throttle back-up valve 110 shown in FIG. 2, passage 210 is exhausted when passage 204 is exhausted, i.e. selected position D as shown in Table 3, and when fluid pressure through passage 215 is applied to the left end surface of the spool 301' through opening 308 of the spool 301'. When the valve spool 301' is urged to right end position as shown in FIG. 9, fluid pressure applied to left end surface of the spool is communicated through opening 308 to passage 204, so that as long as passage 204 is communicated to fluid pressure, the spool 301' maintains right end position. Thus, at selected position D and 1st speed of the position "1," passage 210 is exhausted and normal throttle pressure is provided through passage 207.

When passage 204 is pressurized and passage 215 is exhausted, i.e. at selected position "2" and 2nd speed of position "1," fluid pressure is applied between lands 303' and 305 of the spool 301'. Thus, similar to the spool 301 shown in FIG. 2, the valve spool 301' is urged leftward as shown in FIG. 8 so that a regulated predetermined pressure is prevailed in the passage 210. Consequently substantially constant and higher pressure prevails through passage 207. Also in this embodiment, line pressure through passage 200 which is regulated by throttle pressure in the pressure regulator valve assembly 102 and 103 is higher and as shown in FIG. 4, does not vary with engine manifold vacuum.

Thus, while the vehicle is driving at high speed gear ratio or 3rd speed ratio, when the operator shifts the manual shift valve 104 to position "2" to effect engine brake function, passage 203 is exhausted and passage 204 is pressurized. Thus, right end surface of the 2nd speed lock-up valve 116 is exhausted to urge the valve spool 335 rightward, so that passage 202 is communicated through passage 212 to engage side chamber 123 of hydraulic servo 122 of the friction brake 6, and passage 214 is exhausted to release the friction clutch 4 and to exhaust release side chamber of the friction brake 6, thus 2nd speed ratio is attained. As the line pressure is higher as shown in FIG. 4, the friction brake 6 is engaged without excess slipping.

In this embodiment shown in FIG. 7, when the manual shift valve 104 is shifted to position "1" and the 1–2 shift valve 105 is urged to rightward to attain 1st speed ratio, passage 204 is communicated through passage 215 to the left end surface of the spool 301' of the throttle back-up valve 110' is urge the spool 301' rightward as shown in FIG. 9 so that line pressure is decreased to normal value as shown in FIG. 3. In this case, as mentioned before, as the engage capacity of the friction brake 7 need not to be a higher value, the friction brake 7 will engage without excess slipping and also without shock.

At position D, as passage 204 is exhausted line pressure is not increased to higher value shown in FIG. 4 all through the three speeds automatic shifting. When the manual shift lever is shifted to position "1" to position "2," the spool 301' is kept to right end position by fluid pressure through passage 204 as shown in FIG. 9, line pressure is maintained to normal value as shown in FIG. 3, so that engaging capacity of the friction brake 6 is maintained at necessary value to the up shifting, so that any excess shock will not be produced.

It will be appreciated that, by adding one simple valve means to hydraulic control system, according to the invention at specified down shifting the shift point is not effected by the engine torque, at specified down shift manual selection at high speed low throttle condition the engaging capacity of the friction element is increased to engage without excess slipping, and also, according to one embodiment of the present invention, when two low speed positions are provided, at manual up shift selection desired low torque capacity of the friction elements is provided to engage the friction element without uncomfortable shock.

What is claimed is:

1. A hydraulic control system for automatic transmission mechanisms for vehicles, said transmission having an input and an output shaft, at least one planetary gear unit disposed between said shafts, and a plurality of friction elements to obtain a plurality of gear ratios by selectively engaging said friction elements by hydraulic pressure distributed in said hydraulic control system, said gear ratios including a plurality of forward drive gear ratios and manually selectable lower gear ratios for obtaining an effective engine brake function while coasting, said hydraulic control system comprising a fluid pump for producing a line pressure, a line pressure regulator valve for controlling said line pressure produced by said pump, a plurality of hydraulic servo means to actuate said friction elements by introducing said line pressure to said servo means, a manual shift valve manually controlling distribution of the line pressure to said servo means, said manual shift valve having at least one high gear ratio position and at least one lower gear ratio position, throttle valve means producing a hydraulic pressure signal representing engine torque, governor valve means producing a hydraulic pressure signal representing vehicle speed, at least one shift valve means for controlling distribution of said line pressure by responding to said pressure signals produced by said throttle valve means and said governor valve means, a throttle pressure passage means communicating said throttle valve means with said shift valve means, a governor pressure passage means communicating said governor valve means with said shift valve means, a first valve means, a first passage means communicating said throttle valve means with said first valve means, said throttle valve means producing said pressure signal by modulating said line pressure as a high pressure source and pressure through said first passage means as low pressure source, a second passage means connecting said first valve means to said manual shift valve, said first passage being exhausted when said manual shift valve is in at least one position which is shiftable to high gear ratio, and said first passage being supplied higher fluid pressure when said manual shift valve is in at least one lower gear ratio position, whereby, when the manual shift valve is shifted to the lower gear ratio position, a higher hydraulic pressure signal which is not effected by said engine torque is present in said throttle pressure passage means to control the gear ratio shift point to substantially constant vehicle speed.

2. A hydraulic control system claimed in claim 1, in which said throttle pressure passage means is connected to said pressure regulator valve to correspondingly increase line pressure as said pressure signal through said throttle pressure passage means increases, so that when said manual shift valve is shifted to said lower gear ratio, said higher hydraulic pressure signal is applied to said pressure regulator valve to increase line pressure and to increase torque capacity of said friction elements.

3. A hydraulic control system claimed in claim 1, in which said throttle pressure passage means is connected to said pressure regulator valve to correspondingly increase said line pressure as said pressure signal through said throttle pressure means increases, and said first valve comprises a throttle back-up valve connected to said first and second passage means, said second passage means being exhausted when said manual shift valve is in at least one of said positions which is shiftable to high gear ratio, and said second passage means being communicated to line pressure when said manual shift valve is shifted to the lower gear ratio position to produce regulated fluid pressure in said first passage means so that a higher hydraulic pressure signal which is not affected by engine torque prevails in said throttle pressure passage means to control gear ratio shift point, to increase line pressure, and to increase torque capacity of said friction elements.

4. A hydraulic control system claimed in claim 1, in which said first valve means comprises a throttle back-up valve through which said first passage means communicates to said second passage means, third passage means communicating said throttle back-up valve to said shift valve, said second passage means being exhausted when said manual shift valve is in at least one of said positions which is shiftable to high gear ratio, said second passage means being communicated to line pressure when said manual shift valve is shifted to the lower gear ratio position to produce regulated fluid pressure in said first passage means, and said third passage means being communicated to line pressure when said transmission mechanism is shifted to a further lower gear ratio position to actuate said throttle back-up valve, whereby said first passage means is blocked from communication to said second passage means and is communicated to exhaust.

5. A hydraulic control system for an automatic transmission mechanism for vehicles, said transmission having an input and an output shaft, at least one planetary gear unit and a plurality of friction elements disposed between said shafts to obtain a plurality of gear ratios by selectively engaging said friction elements by hydraulic pressure distributed in said hydraulic control system, said gear ratios including a plurality of forward drive gear ratios and manually selectable lower gear ratios for providing an engine braking function during coasting, said hydraulic control system comprising a fluid pump for producing line pressure, a line pressure regulator valve controlling the line pressure produced by said pump, a plurality of hydraulic servo means to actuate said friction elements respectively by introducing said line pressure to said servo means, a manual shift valve for manually controlling distribution of the line pressure to said servo means, said manual shift valve having at least one lower speed ratio and being shiftable to a higher speed ratio position, throttle valve means producing a hydraulic pressure signal representing engine torque, governor valve means producing a hydraulic pressure signal representing vehicle speed, at least one shift valve means for controlling distribution of line pressure in response to said pressure signals, said throttle valve means and governor valve means being hydraulically connected to said shift valve means, a first valve means hydraulically connected to said pressure regulator valve means being actuatable to introduce a hydraulic pressure signal to said pressure regulator valve to increase line pressure corresponding to the value of the introduced pressure signal, said first valve means blocking the introduction of said pressure signal to said pressure regulator valve means when said manual shift valve is in at least one of said positions which is shiftable to high gear ratio, said first valve being actuated to introduce said pressure signal to said regulator valve means when the manual shift valve is shifted to a first low gear ratio position, said first valve means further including a movable valve spool, said valve spool being displaced to block said pressure signal when the manual shift valve is shifted to a second lower gear ratio position, said valve spool of said first valve being clamped to maintain said blocking when the manual shift valve is shifted from said second lower position to said first low position, whereby line pressure is increased to increase torque capacity of the friction elements only when down shifting to a specified low gear ratio position.

6. A hydraulic control system claimed in claim 5, in which said first valve means comprises a throttle back-up valve, a first passage means communicating said throttle back-up valve to said throttle valve, a second passage means communicating said throttle back-up valve to said manual shift valve, a third passage means communicating said throttle back-up valve to said shift valve means, said throttle valve means being actuatable as a regulator valve between line pressure as a high pressure source and hydraulic pressure in said first passage means as a low pressure source to produce the hydraulic pressure signal in said throttle pressure passage means, said throttle pressure passage means being communicated to said pressure regulator valve to regulate line pressure as a function of said pressure signal in the throttle pressure passage means, said first passage means being communicated to said second passage means through said throttle back-up valve, the second passage means being exhausted when the manual shift lever is shifted to said high gear ratio positions, said second passage means being communicated to line pressure to introduce regulated pressure in said first passage means when the manual shift valve is shifted to the first low gear ratio position, said third passage means being communicated to line pressure to actuate said throttle back-up valve to block the first passage means from said second passage means and to exhaust the first passage means, said first passage means remaining blocked from said second passage means until said second and third passages are both exhausted.

References Cited
UNITED STATES PATENTS

| | | | |
|---|---|---|---|
| 3,310,991 | 3/1967 | Leonard | 74—869X |
| 3,362,261 | 1/1968 | Synder et al. | 74—869X |
| 3,393,585 | 7/1968 | Pierce, Jr. | 74—869X |
| 3,446,098 | 5/1969 | Searles | 74—869 |

ARTHUR T. McKEON, Primary Examiner